(12) United States Patent
Tiemann et al.

(10) Patent No.: US 6,172,790 B1
(45) Date of Patent: Jan. 9, 2001

(54) ELECTROOPTIC MODULATOR FOR FREQUENCY TRANSLATION APPLICATIONS

(75) Inventors: Jerome Johnson Tiemann, Schenectady; Richard Louis Frey, Delanson; William Taylor Lotshaw, Niskayuna, all of NY (US)

(73) Assignee: Lockheed Martin Corp., Marietta, GA (US)

( * ) Notice: Under 35 U.S.C. 154(b), the term of this patent shall be extended for 0 days.

(21) Appl. No.: 09/504,166

(22) Filed: Feb. 15, 2000

Related U.S. Application Data

(62) Division of application No. 09/173,264, filed on Oct. 15, 1998, now Pat. No. 6,081,358.

(51) Int. Cl.[7] .............................. G02F 1/07; G02B 6/42; G02B 6/26
(52) U.S. Cl. ............................ 359/245; 385/15; 385/47
(58) Field of Search .................... 359/125, 142, 359/145, 146, 154, 164, 180, 181, 189, 245; 385/15, 24, 27, 39, 47

(56) References Cited

U.S. PATENT DOCUMENTS

| | | |
|---|---|---|
| 4,317,614 * 3/1982 | Palmer ................................. | 385/24 |
| 4,755,016 * 7/1988 | DeLoach, Jr. et al. .............. | 359/188 |
| 4,882,547 * 11/1989 | Katz ..................................... | 359/125 |
| 5,031,984 * 7/1991 | Eide et al. ............................ | 385/27 |
| 5,067,787 * 11/1991 | Gillham et al. ....................... | 385/50 |
| 5,710,651 * 1/1998 | Logan, Jr. ............................ | 359/125 |

* cited by examiner

*Primary Examiner*—Ricky Mack
(74) *Attorney, Agent, or Firm*—W. H. Meise; E. R. Katz

(57) ABSTRACT

A reflective modulator (10) includes a light splitter (12) which divides light into two portions, one of which is applied to a directional coupler (14) by a first path (20), and the other of which is applied to the directional coupler (14) by way of cascaded electrooptic (e-o) modulators (18a, 18b). One port of the directional coupler (14) is terminated in a reflector (22), and the other in an absorptive termination (24). Electrical signals A and B are applied to the modulators (18a, 18b), with the result of generation of sum and difference frequencies modulating the light. The light leaves the reflective modulator (10) and is coupled to a utilization apparatus (64) by a second directional coupler (28). A further e-o modulator (26) may be coupled in the first path, for controlling the long-term average phase shift. In a particularly advantageous embodiment of the invention, the signal sources (30a, 30b) are elemental antennas of an array (30).

3 Claims, 5 Drawing Sheets

ELECTROOPTIC MODULATOR FOR FREQUENCY TRANSLATION APPLICATIONS

This patent application is a divisional of allowed patent application Ser. No. 09/173,264, filed Nov. 15, 1998 now U.S. Pat. No. 6,081,358.

FIELD OF THE INVENTION

This invention relates to communications, and more specifically to conversion between communications in optical form and electrical or electromagnetic form.

BACKGROUND OF THE INVENTION

There has been increasing use of optical communications for terrestrial and vehicular use, partially because of the low cost and light weight of many optical components, particularly optical fiber transmission paths, and partially because an optical path can accommodate many light carrier wavelengths, each having a wide bandwidth capable of carrying multiple channels of information. Optical paths are also resistant to electromagnetic interference.

The wide bandwidth of optical channels allows carrying digital information, and also allows carrying many channels of analog information, each on an individual subcarrier. This use, in turn, results in a need for simple and effective ways to shift each electrical baseband frequency to a different carrier frequency. This frequency shifting task is normally accomplished by a heterodyne mixer or modulator.

Improved arrangements for frequency shifting baseband signals to subcarrier frequencies are desired for use in optical communication systems.

SUMMARY OF THE INVENTION

An optical modulator according to an aspect of the invention includes a splitter/combiner light coupler including first, second, and third ports. The splitter/combiner light coupler divides light applied to the third port into substantially equal first and second portions at the first and second ports, respectively. A first optical directional coupler includes first and second coupled transmission paths, the first coupled transmission path of the first optical directional coupler defines first and second ports, and the second coupled transmission path of the first optical directional coupler defines first and second ports. A first light transmission path includes first and second cascaded electrooptic portions. Each of the first and second electrooptic portions includes an electrical input port, by which the index of refraction of each electrooptic portion is responsive to electrical signals applied to its electrical input ports. The first light transmission path extends from the first port of the splitter/combiner light coupler to the first port of the first transmission path of the first optical directional coupler. A second light transmission path is provided, which extends from the second port of the splitter/combiner light coupler to the first port of the second transmission path of the first optical directional coupler. An optical reflector is coupled to the second port of one of the first and second transmission paths of the first optical directional coupler. An optical absorber is coupled to the second port of the other one of the first and second transmission paths of the first optical directional coupler. As a result of this arrangement, light applied to the third port of the splitter/combiner light coupler is modulated by the (multiplicative) product of the electrical signals applied to the electrical input ports of the first and second electrooptic portions. In a particularly advantageous version of this embodiment, a third electrooptic portion including an electrical input port is coupled in cascade with the second light transmission path.

In order to separate the modulated light from the unmodulated light, a reflective optical modulator as described above is further associated with a second optical directional coupler including a first port, a second port, and a third port, for coupling light applied to the first port to the second port, and for coupling light applied to the second port to the third port, the second port of the second optical directional coupler being coupled to the third port of the splitter/combiner light coupler, whereby signals applied to the first port of the second optical directional coupler are coupled to the reflective modulator, and modulated light from the reflective modulator is coupled to the third port of the second optical directional coupler by way of the second port of the second optical directional coupler.

Another hypostasis of the invention is an array antenna, which includes a plurality of antenna elements, each including a port at which received signals appear, and also includes an optical fiber onto which light signals representing the individual signals received by the plurality of antenna elements are to be coupled. A source of light is provided, as is a source of a plurality of electrical carriers, each at a frequency which is offset from the frequencies of the other carriers. A plurality of optical modulators is included, each including a light port, and first and second electrical ports. Each of the optical modulators modulates light applied to its light port in response to the product of the electrical signals applied to the first and second electrical ports. Each one of the plurality of optical modulators has its first electrical port coupled to the port of one of the plurality of antenna elements, its second electrical port coupled to the source of a plurality of electrical carriers, for receiving one of the carriers therefrom, and its light port coupled to the source of light. A coupling arrangement is coupled to the optical fiber and to the light ports of the plurality of optical modulators.

In a particular avatar of the array antenna according to the invention, each optical modulator comprises a splitter/combiner light coupler including first and second ports, and the light port. The splitter/combiner light coupler divides light applied to the light port into (preferably equal) first and second portions at the first and second ports, respectively. A first optical directional coupler includes first and second mutually coupled transmission paths. The first transmission path of the first optical directional coupler defines first and second ports, and the second transmission path of the first optical directional coupler defines first and second ports. A first light transmission path includes first and second cascaded electrooptic portions. The first and second electrooptic portions include the first and second electrical input ports, respectively. The index of refraction of the electrooptic portions is responsive to electrical signals applied to the electrical input ports. The first light transmission path extends from the first port of the splitter/combiner light coupler to the first port of the first transmission path of the first optical directional coupler. A second light transmission path extends from the second port of the splitter/combiner light coupler to the first port of the second transmission path of the first optical directional coupler. An optical reflector is coupled to the second port of one of the first and second transmission paths of the first optical directional coupler. An optical absorber is coupled to the second port of the other one of the first and second transmission paths of the first optical directional coupler. As a result, the light applied from the source of light to the light port of the splitter/combiner light coupler is modulated by the multiplicative product of the electrical signals applied to the electrical input ports of the first and second electrooptic portions. In a particular manifestation of this avatar, the coupling arrangement comprises a second light directional coupler associated with each of the splitter/combiner light couplers. Each of the second light directional couplers includes a first port, a second port, and a third port, for coupling light applied to the first port to the second port, and for coupling light applied to the second port to the third port. The second port of the second optical directional coupler is coupled to the third port of the associated one of the splitter/combiner light coupler. As a result, signals applied to the first port of the second optical directional coupler are coupled to the optical modulator, and modulated light from the optical modulator is coupled to the third port of the second optical directional coupler by way of the second port of the second optical directional coupler.

A method for receiving signals by way of an array antenna includes the steps of: (a) generating carrier light; (b) generating a plurality of electrical carrier signals, each of which is offset in frequency from all of the other electrical carrier signals, to thereby produce offset carrier signals; (c) applying carrier light to a light splitter, for dividing the carrier light into at least first and second portions, preferably of equal amplitude; (d) transmitting the first portion of the carrier light to a first port of a four-port directional coupler by way of a first light path; (e) transmitting the second portion of the carrier light to a cascade of first and second electrooptic modulators; (f) applying received signal from one of the antenna elements of the array antenna to one of the first and second electrooptic modulators, for modulating the second portion of the light; (g) coupling one of the plurality of electrical carrier signals to the other one of the electrooptic modulators, for further modulating the second portion of the light; (h) coupling modulated light from the cascade of first and second electrooptic modulators to a second port of the four-port directional coupler; (i) reflecting light exiting from the third port of the four-port directional coupler, so that the reflected light re-enters the third port and flows, at least in part, to the fourth port of the four-port directional coupler, where the reflected light sums with light coupled from at least one of the first and second ports; (j) absorbing any net light leaving the fourth port, whereby the interaction of the light reaching the fourth port variously results in reinforcement (addition) and cancellation (subtraction), which results in mixing of the carrier light, and received and electrical carrier signals, to produce carrier light mixed with the received electrical signals and the one of the offset carrier signals; (k) for each pair of the received signals and electrical carrier signals, repeating the steps of applying carrier light to a light splitter, transmitting the first portion, transmitting the second portion, applying received signal, coupling one of the plurality of electrical carrier signals, coupling modulated light, reflecting light, and absorbing any net light; (l) combining the resulting carrier light mixed with the received electrical signals and offset carrier signals, to produce combined signals. The resulting optical signals representing the received electrical signal at each antenna element can be transmitted over the same optical path, such as an optical fiber path, since the signals are at different optical wavelengths.

DESCRIPTION OF THE INVENTION

Figure 1:
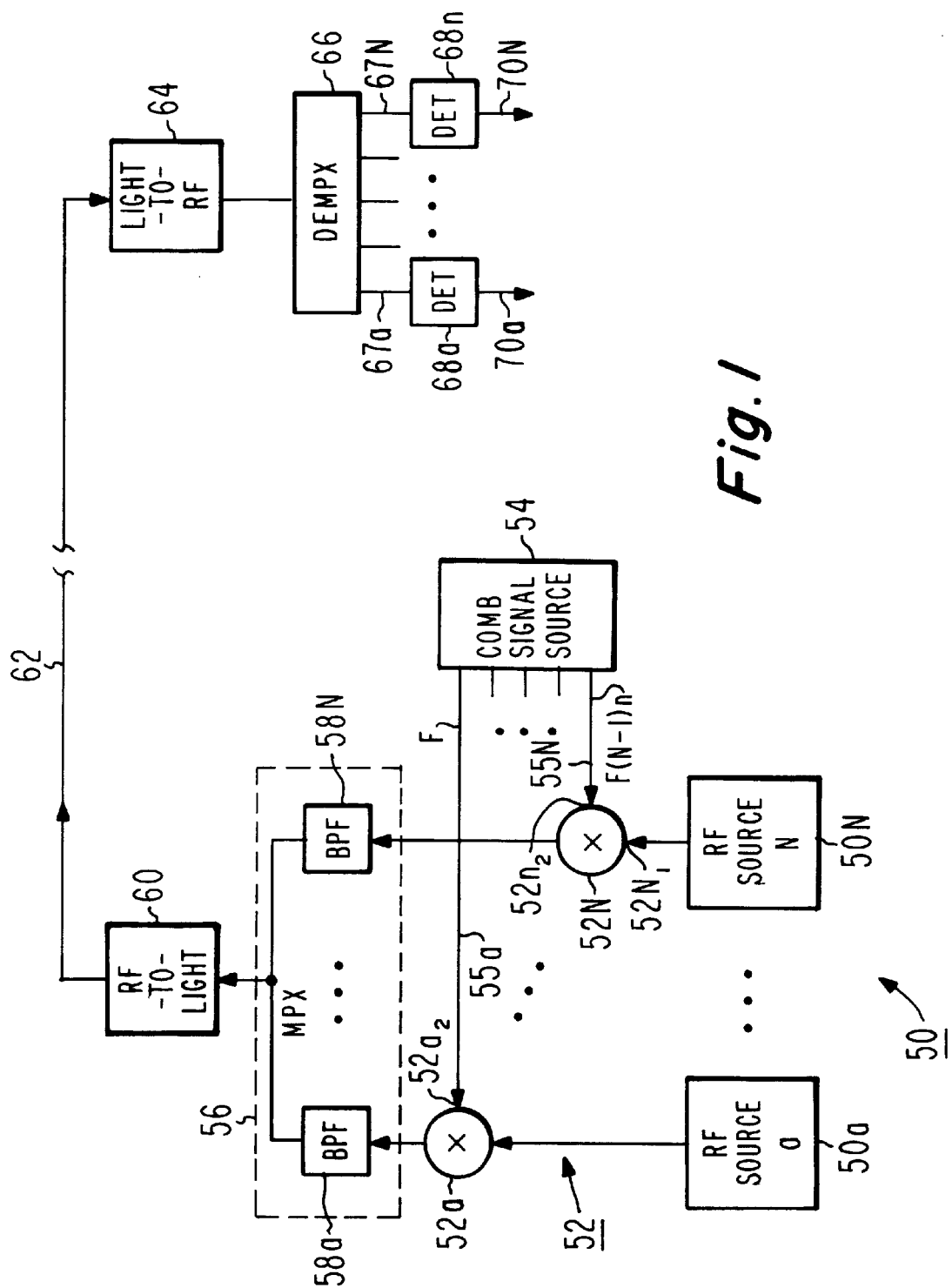
FIG. 1 is a simplified diagram in block and schematic form, illustrating an arrangement by which electrical signals from a plurality of sources, which may be elements of an antenna, may be coupled over an optical transmission path.

In FIG. 1, a set 50 includes a plurality of sources of electrical signal, which are illustrated as blocks 50a, . . . , 50N. In a communication system, these may be discrete sources of different data, or in the context of an array antenna, they may represent the various elemental antennas (antenna elements) of the array. The electrical signals produced by the source set 50 are generally termed "radio frequency" (RF) signals. The term "RF" at one time referred to electrical signals in the frequency range from 550 to 1600 KHz, but more recent usage applies the term to any frequency from above the audio range of about 20 or 30 KHz to the lower infrared frequencies. The electrical signals produced by the set 50 are individually applied to input ports $52a_1, \ldots, 52N_1$ of an array 52 of multipliers or modulators $52a, \ldots, 52N$. Multipliers $52a, \ldots, 52N$ of set 50 also each receive an electrical carrier signal at second input ports $52a_2, \ldots, 52N_2$ from a block 54, which is designated as a "comb" or echinate signal generator. A comb signal is a set of electrical signals having equal frequency increments, and often connotes equal amplitudes. In the arrangement of FIG. 1, the comb signals may be viewed as being at frequencies of F, F+n, F+2n, . . . , F+Nn, where n is a frequency increment, and N corresponds to the number of RF sources of set 50. In the arrangement of FIG. 1, frequency F is applied over signal path 55a to second input port $52a_2$ of multiplier 52a, and frequency F(N−1)n is applied over signal path 55N to second input port $52N_2$ of multiplier 52N. Multipliers 52a, . . . , 52N of set 50 multiply the two signals applied to their input ports, and produce sum and difference signals, each of which is offset from the next by the offset frequency n. The offset signals from set 50 of multipliers are applied through a set or multiplexer 56 of bandpass filters, each of which passes or selects one of the sum or difference frequencies, and rejects the other. Thus, the RF signal from source 50a is multiplied by frequency F in multiplier 52a, and the resulting sum and difference electrical signals are applied to bandpass filter (BPF) 58a, which passes the sum signal, and rejects the difference. Similarly, the RF signal from source 50N is multiplied by frequency F(N−1)n in multiplier 52N, and the resulting sum and difference signals are applied to BPF 58N, which passes the sum signal, and rejects the difference.

The sum electrical signals passed by the bandpass filters 58a, . . . , 58N of multiplexer set 56 of bandpass filters of FIG. 1 are applied jointly (together) to an RF-to-light converter illustrated as a block 60, which converts the electrical signals into a modulated light signal. Such RF-to-light converters are very well known, and in their simplest form amount to no more than a solid-state laser. More particularly, the light signal is in the form of a wavelength of light, modulated by the light equivalent of the individual RF signals, each at a wavelength offset from others of the light-equivalent RF signals by a wavelength corresponding to the offset frequency n. The modulated light signal is applied from converter 60 to a light transmission path illustrated as an optical fiber 62, but which may include free-space light transmission paths, wavelength conversion, amplification, branching, and the like. The light transmission path 62 ends at a light-to-RF converter illustrated as a block 64. Such light-to-RF converters are also well known, and may be as simple as a photodiode. Light-to-RF converter 64 converts the light arriving from signal path 62 into RF, which, in principle, is identical to that which was applied to RF-to-light converter 60. Thus, the RF signal at the output of light-to-RF converter 64 includes the comb of offset frequencies, each modulated by the associated RF signal from one of the sources of set 50. A demultiplexer 66 separates the individual signals into different paths $67a, \ldots, 67N$, from which the individual signals are applied to RF detectors $68a, \ldots, 68N$. Detectors $68a, \ldots, 68N$ demodulate the signals to recover the information carried thereon, which is coupled to signal paths $70a, \ldots, 70N$.

It will be noticed that conversion of the array of RF signals from source set 50 in the arrangement of FIG. 1 requires RF multipliers $52a, \ldots, 52N$ of set 52, multiplexer 56, and RF-to-light converter 60. In the context of an array antenna, the presence of such RF processing equipment is often inconvenient, because of its bulk.

Figure 2:
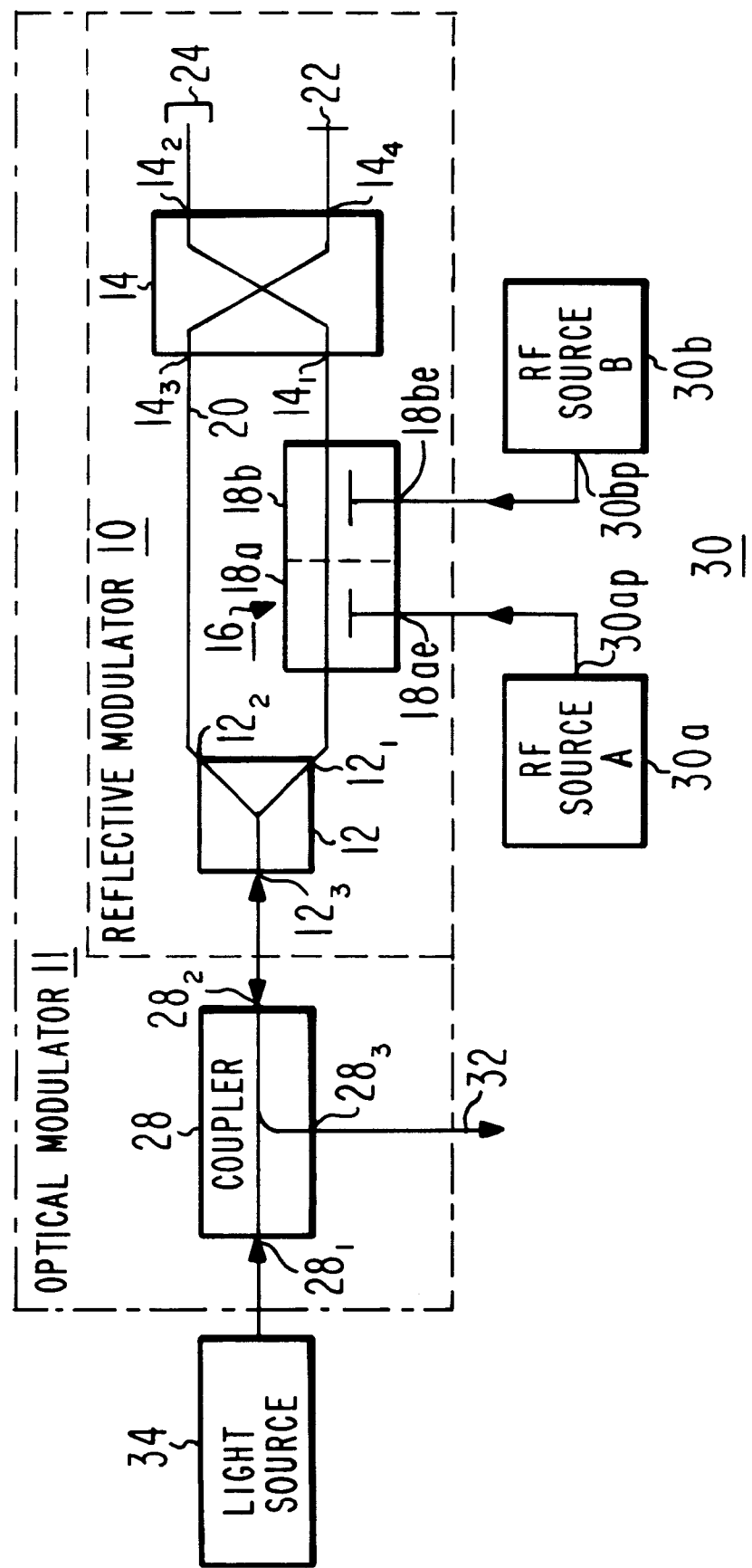
FIG. 2 is a simplified diagram, in block and schematic form, of an electrooptical modulator for frequency translation, according to an aspect of the invention.

In FIG. 2, a light source 34 generates light, and applies it to an input port $28_1$ of a light directional coupler 28 of an optical modulator 11. The light from source 34 propagates through coupler 28, and exits at a port $28_2$. The light exiting port $28_2$ of coupler 28 is applied to a reflective light modulator 10, and more particularly to an input/output port $12_3$ of a splitter/combiner 12 of reflective modulator 10. Light applied to port $12_3$ of splitter/combiner 12 is split into two portions, ideally of equal amplitude, and appears at ports $12_1$ and $12_2$.

In FIG. 2, a light directional coupler 14 of reflective modulator 10 includes two mutually coupled transmission paths 14a and 14b. Coupled path 14a has two ports, $14_1$ and $14_2$. Coupled path 14b has two ports, $14_3$ and $14_4$. The light which leaves port $12_2$ of splitter/combiner 12 is coupled by way of an optical fiber path illustrated as 20 to port $14_3$ of the first transmission path 14a of mutually coupled transmission paths 14a, 14b. The light which leaves port $12_1$ of splitter/combiner 12 flows to port $14_1$ of directional coupler 14 by way of a path 16. Path 16 includes a cascade of first and second electrooptic modulators or phase shifters designated 18a and 18b. While illustrated and designated separately, electrooptic modulators or phase shifters 18a, 18b may be part of the same structure, requiring only separate modulation functions. Such electrooptic phase shifters are well known, and require only imposition of an electric field across electrodes on an electrooptic material through which the light flows. As illustrated in FIG. 2, a source of RF 30a has its electrical output port $30_{ap}$ coupled to an electrical input port 18ae of modulator 18a, and a source of RF 30b has its electrical output port $30_{bp}$ coupled to electrical input port 18be of modulator 18b. A light-reflective termination 22 is coupled to port $14_4$ of directional coupler 14, and a light-absorbing termination 24 is coupled to port $14_2$ of directional coupler 14.

In operation of the modulator arrangement 10 of FIG. 2, light applied to input port $12_3$ of splitter/combiner 12 is split into two portions, a first portion flows over optical path 20 to directional coupler 14, and a second portion flows over optical path 16, including modulators 18, to directional coupler 14. Directional coupler 14 couples a portion of the light applied to its port $14_1$ directly through path 14a to port $14_2$, and another portion to port $14_4$. Also, directional coupler 14 couples a portion of the light applied to its port $14_3$ directly through path 14b to port $14_4$, and another portion to port $14_4$. Thus, a portion of the light applied to each of ports $14_1$ and port $14_2$ appears at each of ports $14_2$ and $14_4$. Since an optical reflector or mirror 22 is coupled to port $14_4$, all the light which exits port $14_4$ is reflected back to the port, and is coupled to ports $14_1$ and $14_3$. Any net light which exits port $14_2$ of directional coupler 14 is absorbed by absorbent termination 24.

Figure 3:
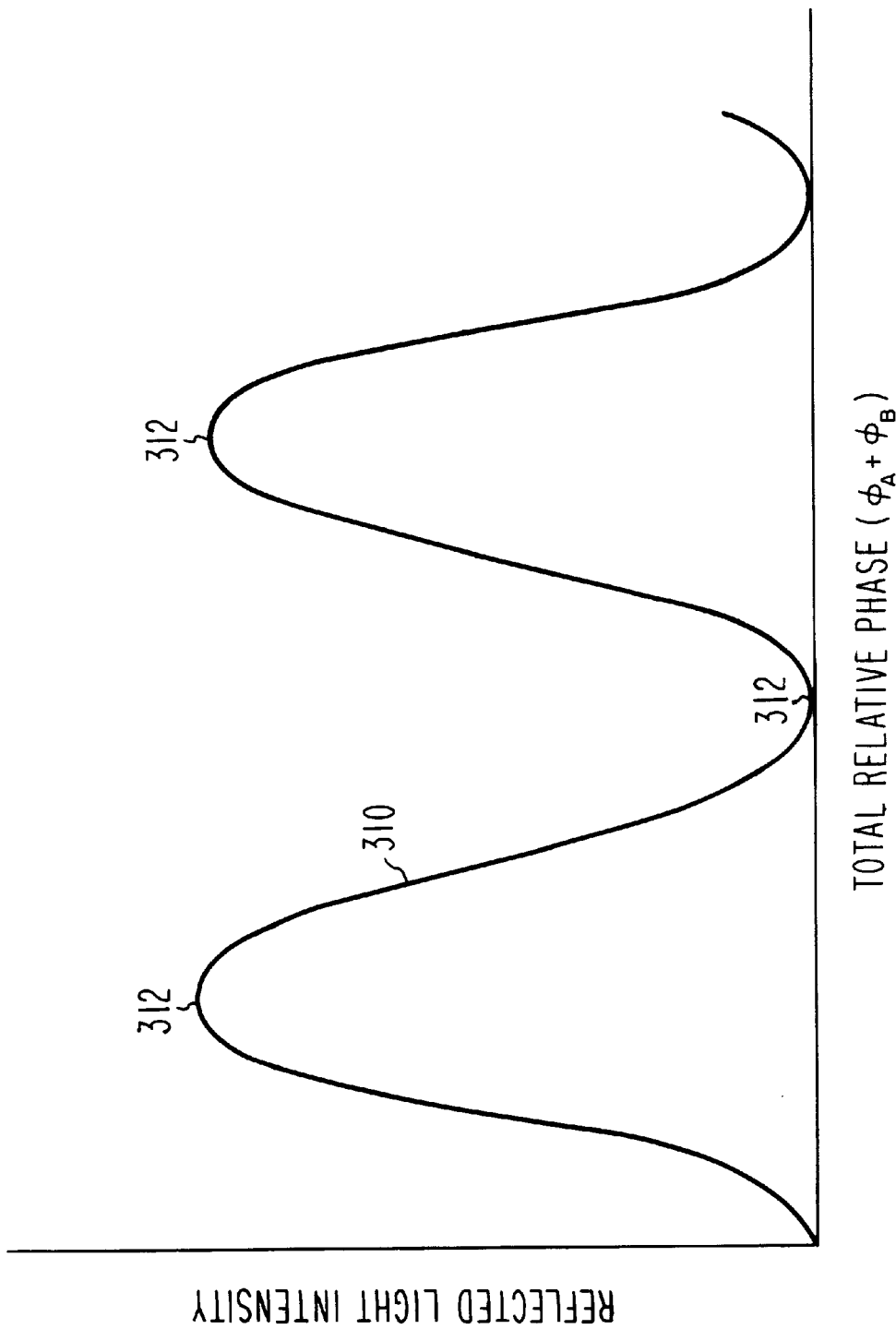
FIG. 3 plots reflected light intensity of a portion of the arrangement of FIG. 2 in response to relative phase in a leg of the arrangement of FIG. 2.

As mentioned, it is the net light which exits port $14_2$ of directional coupler 14 which is absorbed by absorbent termination 24. Since the light exiting port $14_2$ includes components from paths 16 and 20, their phases may differ by the amount of any inherent phase shift between the paths 16 and 20, plus any phase shift imparted by the modulators 18a, 18b in response to RF signals from sources 30a and 30b. Under some circumstances, the two components of the light appearing at port $14_2$ of directional coupler 14 will be in-phase, and the components will sum, and be absorbed by absorbent termination 24. Under other conditions, the two components of light appearing at port $14_2$ of directional coupler 14 will be out-of-phase, and the components will cancel or partially cancel. When two light signals cancel, the result is no light. One might view the effect of cancellation of the two signal components at port $14_2$ as turning absorbent termination 24 into a reflective termination. Put another way, changing the phase of the signal traversing path 16 of reflective modulator 10 of FIG. 2 over its full range results in variation of the amount of reflection at port $14_2$. It should be noted that the same cancellation and reinforcement of the light components occurs at port $14_4$, but is irrelevant since the result is always reflection. FIG. 3 plots the reflection of light as measured at port $12_3$ of splitter/combiner 12 of modulator 12, as a function of total phase $\Theta_A+\Theta_B$ contributed by the phase modulator sections 18a and 18b. As illustrated in FIG. 3, the plot 310 ranges from an amplitude of zero to a maximum amplitude, which may be interpreted as total reflection, except for unavoidable losses in the optical components. Near each of the peak values and minimum values of plot 310 is a region designated 312, which may be termed "parabolic," in which there is an approximately quadratic relationship between the phase and the light intensity. Such a relationship of the intensity I to the magnitudes A and B of the electrical signals may be expressed as $$I=(A+B)^2 \qquad 1$$

in which case the frequency components of A and B will mix, in such a manner as to produce sum and difference frequencies.

Thus, the light reflected by the reflective modulator 10 of FIG. 2 includes sum and difference frequencies of the electrical components A and B, so long as operation is maintained in the parabolic regions 312 of FIG. 3. Reflection of light by reflective modulator 10 of FIG. 2 results in light leaving reflective modulator 10, and proceeding into port $28_2$ of directional coupler 28. The directional coupler routes the reflected light from its port $28_2$ to port $28_3$, whence the reflected light, with its modulation, is separated from the incident light applied from source 34 to coupler 28, and the reflected light becomes available on optical path 32. Modulator 11 of FIG. 2 can be viewed as being a block having two electrical input ports, namely 18ae and 18be, a light input port $28_1$, and a light output port $28_3$.

Figure 4:
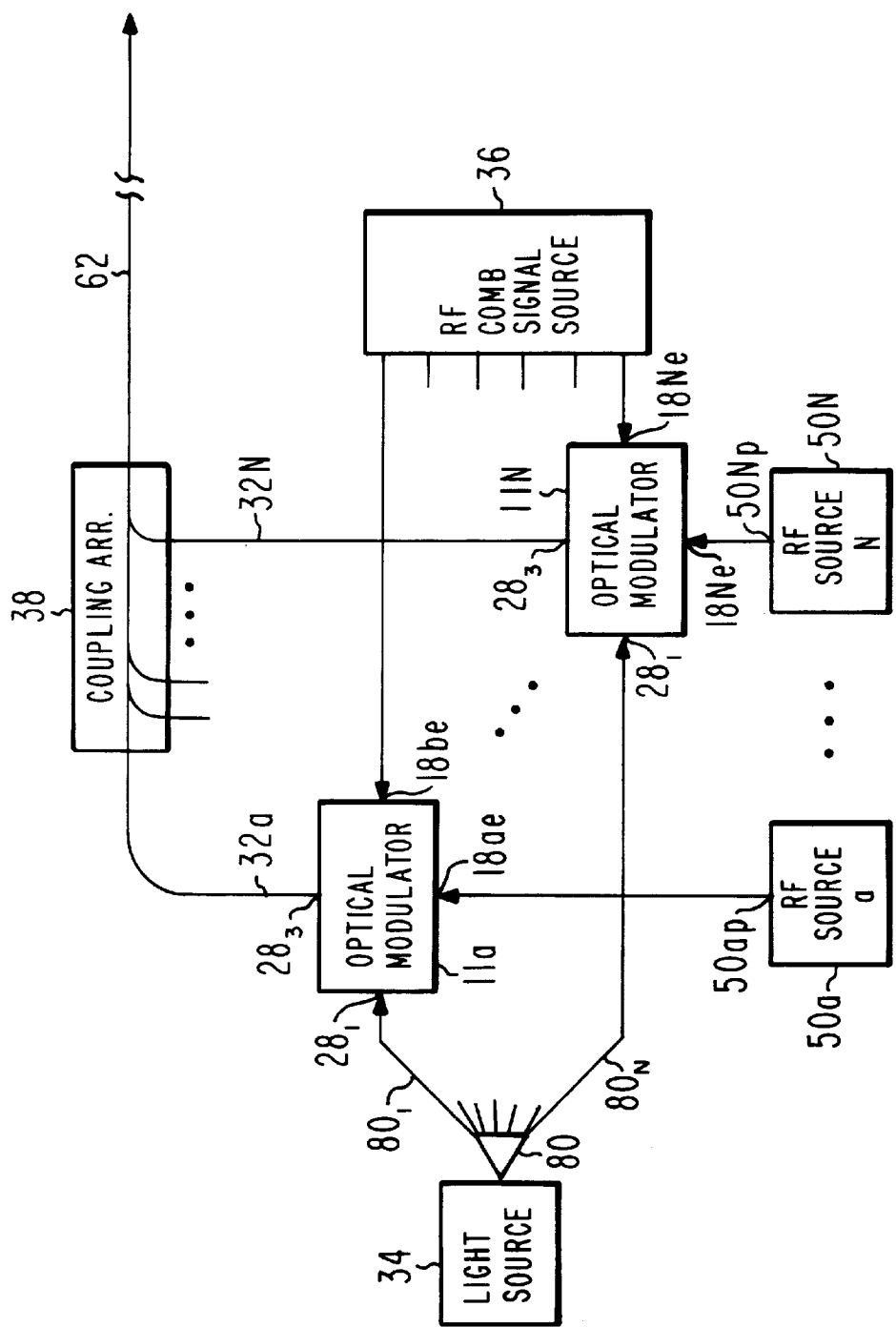
FIG. 4 illustrates another embodiment of the arrangement of FIG. 2, in which long-term average phase can be controlled.

FIG. 4 illustrates an arrangement for performing some of the functions of FIG. 1 using the modulator 11 of FIG. 2. In FIG. 4, a light source 34 is coupled to a light splitter 80, which divides the light into N portions, which are applied over optical paths $80_1, \ldots, 80N$ to the input ports $28_1$ of a plurality of optical modulators, each identical to modulator 11 of FIG. 2, which are designated 11a, ..., 11N. Each optical modulator 11a, ..., 11N of FIG. 4 has four ports, namely a light input port $28_1$, first and second electrical input ports 18ae and 18be, and a modulated light output port $28_3$, all corresponding to the ports of modulator 11 of FIG. 2 taken as a block.

In the arrangement of FIG. 4, each optical modulator 11a, ..., 11N receives, at its input port 18ae, an electrical RF signal from the output port 50ap, ..., 50Np of an associated source 50a, ..., 50N, respectively, and an RF offset frequency from an output of comb signal generator 36 at its input port 18be. Each modulator 11a, ..., 11N performs modulation as described in conjunction with FIGS. 2 and 3, and the resulting modulated light is output from its modulated light output port $28_3$ onto a signal path 32a, ..., 32N. The modulated light signals are collected by a coupler 38, and coupled onto optical path 62. Coupler 38 does not have to be a wavelength-dependent multiplexer, because the light signals appearing on signal paths 32a, ..., 32N are already at disparate frequencies or wavelengths, as a result of the modulation. The arrangement of FIG. 4 is advantageous by comparison with the arrangement of FIG. 1 because the modulation requires no RF bandpass filters, multiplexers or multipliers. Instead, all of the modulation can be performed directly in an optical arrangement, which is more suitable for placement near the elements 50a, ..., 50N of an array antenna.

Figure 5:
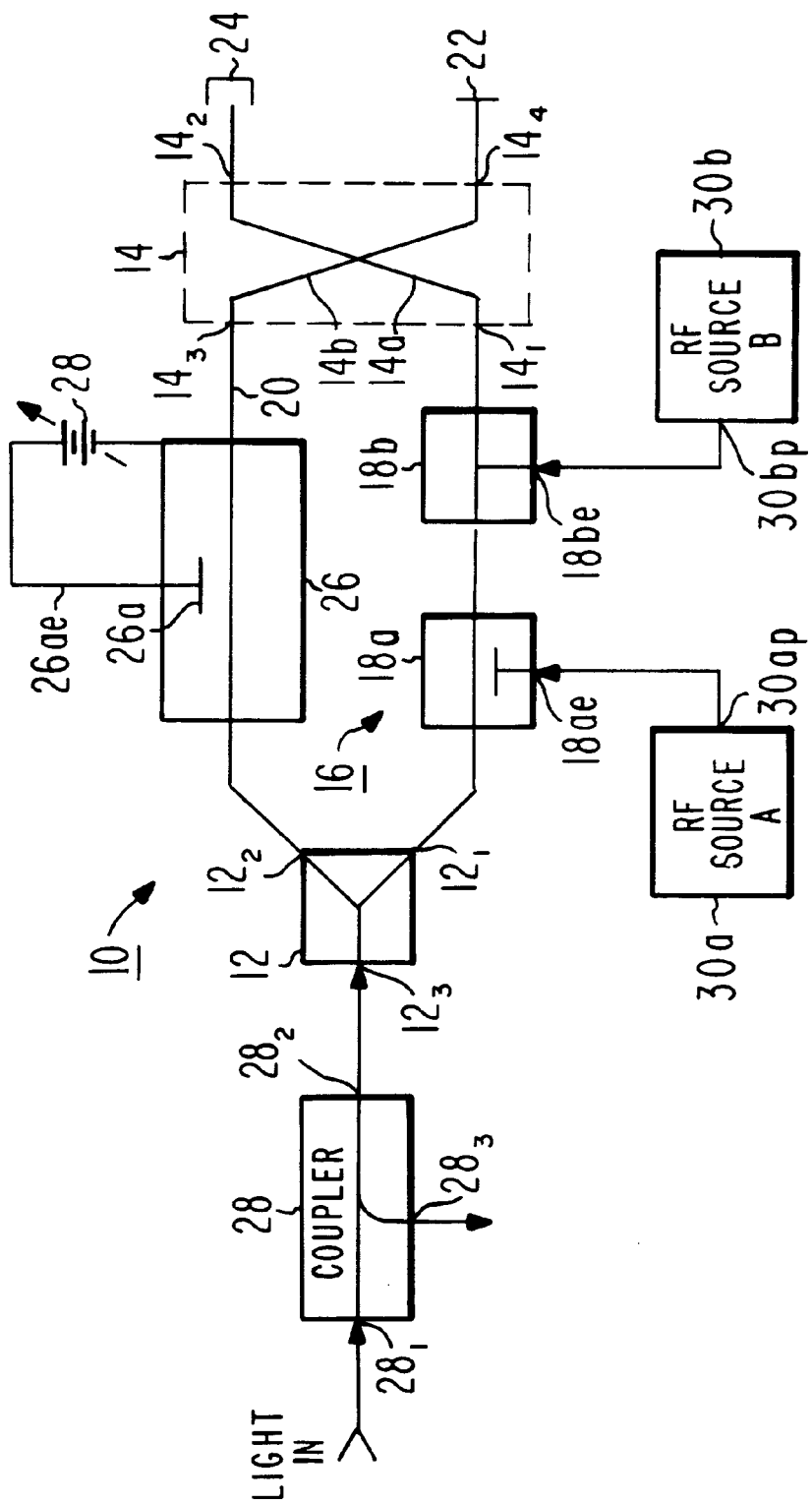
FIG. 5 is a simplified diagram in block and schematic form, illustrating how the arrangement of FIG. 3 can be adjusted for optimum operation.

FIG. 5 is a simplified diagram, in block and schematic form, of an arrangement according to an aspect of the invention, in which a reflective modulator 10 as described in conjunction with FIG. 2 has an adjustment for long-term average phase. Elements of FIG. 5 corresponding to those of FIG. 2 are designated by like reference numerals. In FIG. 5, path 20 includes a further electrooptic element 26, the electrode 26a of which is coupled by a conductive path designated 26ae to a source of controllable electrical bias, represented by a battery arrow symbol 28. In operation, the bias provided by source 28 is adjusted to optimize operation in the square-law region, represented by portions 312 of the plot of FIG. 3.

Other embodiments of the invention will be apparent to those skilled in the art. For example, the bias provided by source 28 may be automatically adjusted by a simple controller which senses the amplitude of either or both of the sum and difference signals produced at port $28_3$ of coupler 28, and perform a continuing process of iterating the bias through a peak amplitude of the sum/difference signal, past the peak by a small amount, and reversing control direction to again pass through the peak. Such a controller is described generally, in a different, and more complex context, in U.S. Pat. No. 4,882,547, issued Nov. 21, 1989 in the name of Katz.

Thus, an optical modulator (10) according to an aspect of the invention includes a splitter/combiner light coupler (12) including first ($12_1$), second ($12_2$), and third ($12_3$) ports. The splitter/combiner light coupler (12) divides light applied to the third port ($12_3$) into substantially equal first and second portions at the first ($12_1$) and ($12_2$) second ports, respectively. A first optical directional coupler (14) includes first (14a) and second (14b) coupled transmission paths, the first coupled transmission path (14a) of the first optical directional coupler (14) defines first ($14_1$) and second ($14_2$) ports, and the second coupled transmission path ($14_2$) of the first optical directional coupler (14) defines first ($14_3$) and second ($14_4$) ports. A first light transmission path (16) includes first (18a) and second (18b) cascaded electrooptic portions. Each of the first (18a) and second (18b) electrooptic portions includes an electrical input port (18ae, 18be), by which the index of refraction of each electrooptic portion (18a, 18b) is responsive to electrical signals applied to its electrical input ports (18ae, 18be). The first light transmission path (16) extends from the first port ($12_1$) of the splitter/combiner light coupler (12) to the first port ($14_1$) of the first transmission path (14a) of the first optical directional coupler (14). A second light transmission path (20) is provided, which extends from the second port ($12_2$) of the splitter/combiner light coupler (12) to the first port ($14_3$) of the second transmission path (14b) of the first optical directional coupler (14). An optical reflector (22) is coupled to the second port ($14_2$; $14_4$) of one of the first (14a) and second (14b) transmission paths of the first optical directional coupler (14). An optical absorber (24) is coupled to the second port ($14_2$; $14_4$) of the other one of the first (14a) and second (14b) transmission paths of the first optical directional coupler (14). As a result of this arrangement, light applied to the third port ($12_3$) of the splitter/combiner light coupler (12) is modulated by the (multiplicative) product of the electrical signals applied to the electrical input ports (18ae, 18be) of the first (18a) and second (18b) electrooptic portions. In a particularly advantageous version of this embodiment, a third electrooptic portion (26) including an electrical input port (26e) is coupled in cascade with the second light transmission path (20).

In order to separate the modulated light from the unmodulated light, an optical modulator (10) as described above is further associated with a second optical directional coupler (28) including a first port ($28_1$), a second port ($28_2$), and a third port ($28_3$), for coupling light applied to the first port ($28_1$) to the second port ($28_2$), and for coupling light applied to the second port ($28_2$) to the third port ($28_3$), the second port ($28_2$) of the second optical directional coupler (28) being coupled to the third port ($12_3$) of the splitter/combiner light coupler (12), whereby signals applied to the first port ($28_1$) of the second optical directional coupler (28) are coupled to the optical modulator (10), and modulated light from the optical modulator (10) is coupled to the third port ($12_3$) of the second optical directional coupler (28) by way of the second port ($28_2$) of the second optical directional coupler (28).

Another hypostasis of the invention is an array antenna, which includes a plurality of antenna elements (30a, 30b, 30N), each including a port (30ap, 30bp) at which received signals appear, and also includes an optical fiber (32) onto which light signals representing the individual signals received by the plurality of antenna elements (30a, 30b, 30N) are to be coupled. A source of light (34) is provided, as is a source (36) of a plurality of electrical carriers, each at a frequency which is offset from the frequencies of the other carriers. A plurality of optical modulators (10) is included, each including a light port ($12_3$; $28_1$), and first (18ae) and second (18be) electrical ports. Each of the optical modulators (10) modulates light applied to the light port ($12_3$) in response to the product of the electrical signals applied to the first (18ae) and second (18be) electrical ports, which are input ports. Each one of the plurality of optical modulators (10) has its first electrical port (18ae) coupled to the port (30ap, 30bp) of one of the plurality of antenna elements (30a, 30b, 30N), its second electrical input port (18be) coupled to the source (36) of a plurality of electrical carriers, for receiving one of the carriers therefrom, and its light port ($12_3$; $28_1$) coupled to the source of light (34). A coupling arrangement ((28, 38) is coupled to the optical fiber (32, 32a, . . . , 32N) and to the light ports ($12_3$) of the plurality of optical modulators (10).

In a particular avatar of the array antenna according to the invention, each optical modulator (10) comprises a splitter/combiner light coupler (12) including first ($12_1$) and second ($12_2$) ports, and the light port ($12_3$). The splitter/combiner light coupler (12) divides light applied to the light port ($12_3$) into substantially equal first and second portions at the first ($12_1$) and second ($12_2$) ports, respectively. A first optical directional coupler (14) includes first (14a) and second (14b) mutually coupled transmission paths. The first transmission path (14a) of the first optical directional coupler (14) defines first ($14_1$) and second ($14_2$) ports, and the second transmission path (14b) of the first optical directional coupler (14) defines first ($14_3$) and second ($14_4$) ports. A first light transmission path (16) includes first (18a) and second (18b) cascaded electrooptic portions. The first (18a) and second (18b) electrooptic portions including the first (18ae) and second (18be) electrical input ports, respectively. The index of refraction of the electrooptic portions (18a, 18b) is responsive to electrical signals applied to the electrical input ports. The first light transmission path (16) extends from the first port ($12_1$) of the splitter/combiner light coupler (12) to the first port ($14_1$) of the first transmission path (14a) of the first optical directional coupler (14). A second light transmission path (20) extends from the second port ($12_2$) of the splitter/combiner light coupler (12) to the first port ($14_3$) of the second transmission path (14b) of the first optical directional coupler (14). An optical reflector (22) is coupled to the second port ($14_3$, $14_4$) of one of the first (14a) and second (14b) transmission paths of the first optical directional coupler (14). An optical absorber (24) is coupled to the second port ($14_3$, $14_4$) of the other one of the first (14a) and second (14b) transmission paths of the first optical directional coupler (14). As a result, the light applied from the source of light (34) to the light port ($12_3$) of the splitter/combiner light coupler (12) is modulated by the multiplicative product of the electrical signals applied to the electrical input ports (18ae, 18be) of the first (18a) and second (18b) electrooptic portions. In a particular manifestation of this avatar, the coupling arrangement (28, 38) comprises a second light directional coupler (28) associated with each of the splitter/combiner light coupler (12)s. Each of the second light directional couplers (28) includes a first port ($28_1$), a second port ($28_2$), and a third port ($28_3$), for coupling light applied to the first port ($28_1$) to the second port ($28_2$), and for coupling light applied to the second port ($28_2$) to the third port ($28_1$). The second port ($28_2$) of the second optical directional coupler (28) is coupled to the third port ($12_3$) of the associated one of the splitter/combiner light coupler (12). As a result, signals applied to the first port ($28_1$) of the second optical directional coupler (28) are coupled to the optical modulator (10), and modulated light from the optical modulator (10) is coupled to the third port ($28_3$) of the second optical directional coupler (28) by way of the second port ($28_2$) of the second optical directional coupler (28).

A method for receiving signals by way of an array antenna includes the steps of: (a) generating carrier light; (b) generating a plurality of electrical carrier signals, each of which is offset in frequency from all of the other electrical carrier signals, to thereby produce offset carrier signals; (c) applying carrier light to a light splitter, for dividing the carrier light into at least first and second portions, preferably of equal amplitude; (d) transmitting the first portion of the carrier light to a first port ($14_3$) of a four-port directional coupler (14) by way of a first light path (20); (e) transmitting the second portion of the carrier light to a cascade of first (18a) and second (18b) electrooptic modulators; (f) applying received signal from one of the antenna elements (30a, 30b, 30N) of the array antenna (30) to one of the first (18a) and second (18b) electrooptic modulators, for modulating the second portion of the light; (g) coupling one of the plurality of electrical carrier signals to the other one (18a, 18b) of the electrooptic modulators, for further modulating the second portion of the light; (h) coupling modulated light from the cascade of first (18a) and second (18b) electrooptic modulators to a second port ($14_1$) of the four-port directional coupler (14); (i) reflecting light exiting from the third port ($14_4$) of the four-port directional coupler (14), so that the reflected light re-enters the third port ($14_4$), and flows, at least in part, to the fourth port ($14_2$) of the four-port directional coupler (14), where the reflected light sums with light coupled from at least one of the first ($14_3$) and second ($14_1$) ports; (j) absorbing any net light leaving the fourth port ($14_2$), whereby the interaction of the light reaching the fourth port ($14_2$) variously results in reinforcement and cancellation, which results in mixing of the carrier light, and received and electrical carrier signals, to produce carrier light mixed with the received electrical signals and the one of the offset carrier signals; (k) for each pair of the received signals and electrical carrier signals, repeating the steps of applying carrier light to a light splitter, transmitting the first portion, transmitting the second portion, applying received signal, coupling one of the plurality of electrical carrier signals, coupling modulated light, reflecting light, and absorbing any net light; (l) combining the resulting carrier light mixed with the received electrical signals and offset carrier signals, to produce combined signals. The resulting optical signals representing the received electrical signal at each antenna element can be transmitted over the same optical path, such as an optical fiber path, since the signals are at different optical wavelengths.

What is claimed is:

1. An optical modulator, comprising:
a splitter/combiner light coupler including first, second and third ports, said splitter/combiner light coupler dividing light applied to said third port into substantially equal first and second portions at said first and second ports, respectively;

a first optical directional coupler including first and second coupled transmission paths, said first transmission path of said first optical directional coupler defining first and second ports, and said second transmission path of said first optical directional coupler defining first and second ports;

a first light transmission path including first and second cascaded electrooptic portions, each of said first and second electrooptic portions including an electrical input port, by which the index of refraction of said electrooptic portion is responsive to electrical signals applied to said electrical input port, said first light transmission path extending from said first port of said splitter/combiner light coupler to said first port of said first transmission path of said first optical directional coupler;

a second light transmission path, said second light transmission path extending from said second port of said splitter/combiner light coupler to said first port of said second transmission path of said first optical directional coupler;

an optical reflector coupled to said second port of one of said first and second transmission paths of said first optical directional coupler; and an optical absorber coupled to said second port of the other one of said first and second transmission paths of said first optical directional coupler, whereby light applied to said third port of said splitter/combiner light coupler is modulated by the product of the electrical signals applied to said electrical input ports of said first and second electrooptic portions.

2. An optical modulator according to claim 1, further comprising a third electrooptic portion including an electrical input port, said third electrooptic portion being coupled in cascade with said second light transmission path.

3. An optical modulator according to claim 1, further comprising a second optical directional coupler including a first port, a second port, and a third port, for coupling light applied to said first port to said second port, and for coupling light applied to said second port to said third port, said second port of said second optical directional coupler being coupled to said third port of said splitter/combiner light coupler, whereby signals applied to said first port of said second optical directional coupler are coupled to said optical modulator, and modulated light from said optical modulator is coupled to said third port of said second optical directional coupler by way of said second port of said second optical directional coupler.

* * * * *